(12) United States Patent
Chin-Pei et al.

(10) Patent No.: US 7,178,982 B2
(45) Date of Patent: Feb. 20, 2007

(54) RETAINING DEVICE FOR ROLLING-ELEMENT

(75) Inventors: Wang Chin-Pei, Taichung (TW); Wu Chun-Liang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 532 days.

(21) Appl. No.: 10/714,099

(22) Filed: Nov. 13, 2003

(65) Prior Publication Data

US 2005/0105839 A1    May 19, 2005

(51) Int. Cl.
*F16C 29/06* (2006.01)

(52) U.S. Cl. .......................... 384/51; 384/45; 384/530

(58) Field of Classification Search ................ 384/523, 384/524, 527, 528, 530, 532, 43, 45, 49, 384/50, 51, 59
See application file for complete search history.

(56) References Cited

U.S. PATENT DOCUMENTS

| 4,558,961 A | * | 12/1985 | Fernlund | 384/526 |
| 4,626,113 A | * | 12/1986 | Forknall et al. | 384/530 |
| 6,966,698 B2 | * | 11/2005 | Wu et al. | 384/49 |

\* cited by examiner

*Primary Examiner*—William C. Joyce
(74) *Attorney, Agent, or Firm*—Charles E. Baxley

(57) ABSTRACT

A retaining device for rolling-element includes the partition and the link-belt. The characteristic of the retaining device for rolling-element is that the partition is linked to form a ring by the link-belt, then the ring is turned in to form a space for retaining the rolling-element, so as to reduce the friction of the rolling-element.

8 Claims, 5 Drawing Sheets

RETAINING DEVICE FOR ROLLING-ELEMENT

BACKGROUND OF THE INVENTION

1. Field of the Invention

The present invention relates to a retaining device for rolling-element, and more particularly to a retaining device for rolling-element which is applied to linear transmission unit.

2. Description of the Prior Arts

The linear transmission units of prior arts generally can be divided into two categories: First one is an independent individual retainer, and another one is a retainer made up of plural independent individuals. As shown in FIG. 4, wherein the slide block 11 is slidably mounted onto a rail, which is interiorly provided with a plurality of rolling-elements 20 and between every two neighboring rolling-elements 20 is provided with a single retainer 30 so as to prevent the rolling-elements 20 from striking with each other. It is time-consuming to assemble this linear transmission unit by alternatively inserting the rolling-element and single retainer in the slide block, furthermore, the retainers and the rolling-elements are coupled with each other closely, such will cause interference in the rolling of the rolling-element.

With reference to FIG. 5, which shows a retainer made up of plural independent individuals, wherein the retainer 31 is made up of plural independent spacers 311 linked together by a flexible chain 312, so as to confine the respective rolling-elements 20 in the intervals between paired neighboring spacers 311. The method of making this kind of retainer 31 is by putting the rolling-elements in a mould and made by plastic ejection molding, the material and the ejection molding machine should be high quality, thus the production cost is relatively increased. Furthermore, due to the special manufacturing method, the retainers and the rolling elements are coupled with each other closely, such will interfere in the rolling of the rolling-element.

The present invention has arisen to mitigate and/or obviate the afore-described disadvantages of the conventional retaining device for rolling-element.

SUMMARY OF THE INVENTION

The primary object of the present invention is to provide a retaining device for rolling-element, which is able to reduce the friction drag, so as to make the rolling-element move smoothly.

The secondary object of the present invention is to provide a retaining device for rolling-element, in which lubricant can flow freely, so as to provide a good lubricating effect.

Since linear transmission unit has been widely applied both in general mechanical industry and precision mechanics, the retaining device for rolling-element which applied to the linear transmission unit is also valued greatly, especially the retaining device of link design type.

The retaining device for rolling-element in accordance with the present invention is of link design type. Wherein a ring structure is initially formed by ejection molding, which includes plural partitions linked by link-belt, a section of the ring structure being connectable to an opposite side portion of the ring structure, so as to make each two corresponding partitions butt-join together, the butt-joined partitions linked by the link-belt and form a space in which the rolling-element is rotatably retained. Therefore, there are flexible spaces left between the rolling-elements and the retaining device, so as to substantially reduce the friction drag of the rolling-elements with respect to the retaining device. Furthermore, the retaining device in accordance with the present invention is produced in general method of ejection molding, and thus the production cost is sharply reduced.

The retaining device for rolling-element in accordance with the present invention can be additionally provided with end-part which serves to retain rolling-element. When the ring structure is turned, the end-part will be located at the end of the retaining device, such that the rolling-elements at the end of the retaining device can be firmly retained in the retaining device.

The present invention can also additionally designed as having a passage formed in the butt-joined partitions, so as to provide a good lubricating effect. The space of the passage is able to expand or contract so as to help the lubricant to more easily flow through the passage, and thus further improve the lubricating effect.

The retaining device for rolling-element in accordance with the present invention can be designed as having a curvature after it is turned in order to fit the shape of the circulating track of the rolling-elements, the radius of the curvature of the retaining device is no minor than that of the circulating track of the rolling element, so as to make the retaining device work smoothly.

In addition, no matter the rolling-element is ball or roller, it is applicable to the retaining device of the present invention, because it is only need to change the shape of the partition according to the shape of the rolling-element.

The present invention will become more obvious from the following description when taken in connection with the accompanying drawings, which shows, for purpose of illustrations only, the preferred embodiments in accordance with the present invention.

DETAILED DESCRIPTION OF THE PREFERRED EMBODIMENTS

Figure 1:
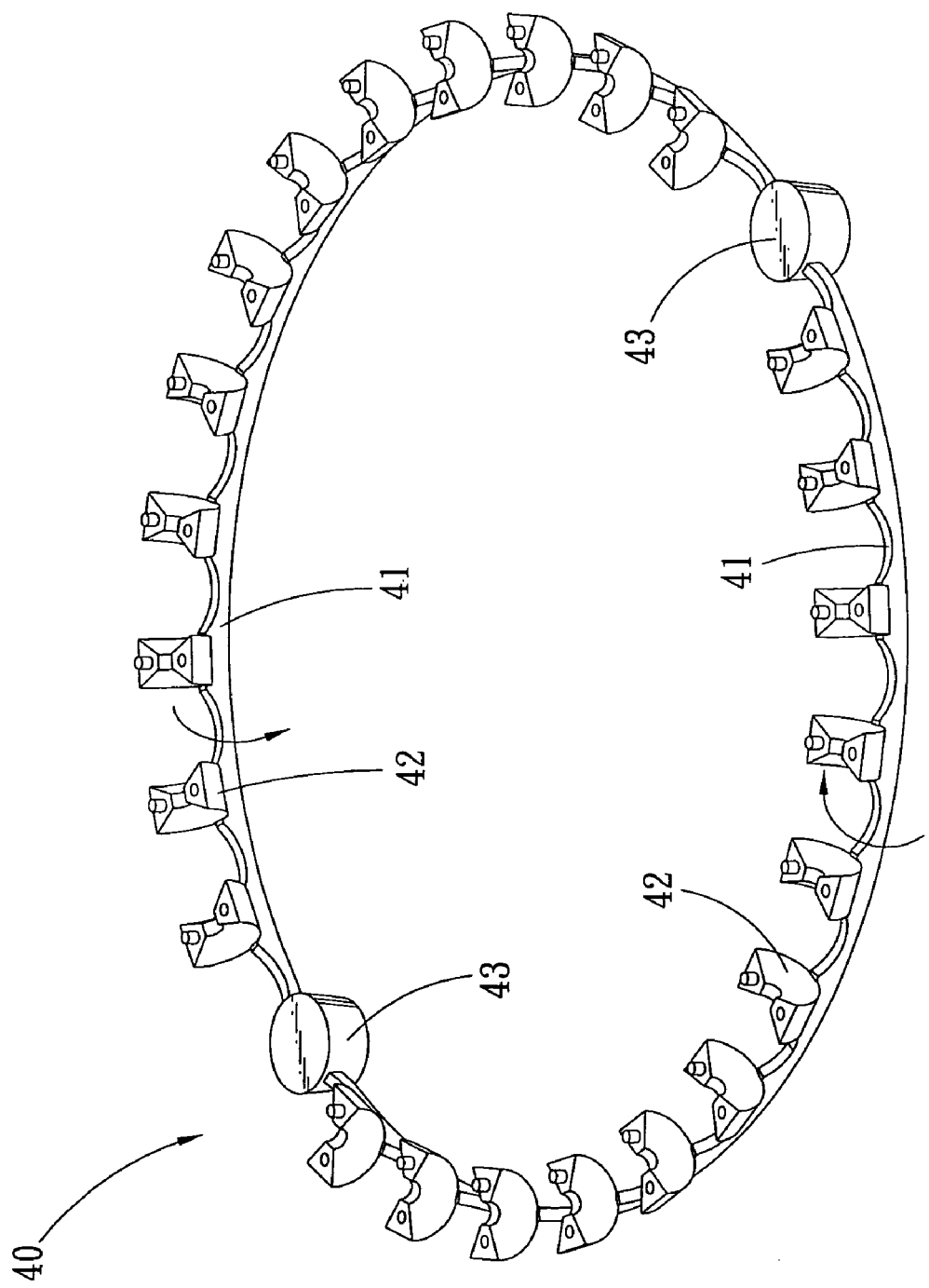
FIG. 1 is a structural view of a retaining device for rolling-element in accordance with the present invention.

Referring to FIG. 1, wherein a ring-shaped retaining device for rolling-element is shown in accordance with a first embodiment of the present invention, here the rolling-elements (not shown) of the retaining device 40 are using balls as example. Wherein the retaining device 40 is a ring structure that is formed by partitions 42 which are linked together by link-belt 41. The link-belt 41 is additionally provided with end-part 43 respectively at its both ends, so as to firmly retain the rolling elements in the retaining device 40. When installing rolling-elements into the retaining device 40, the retaining device 40 should be turned inward, and then install the rolling-elements sequentially, so as to form a complete retaining device for rolling-elements.

Figure 2:
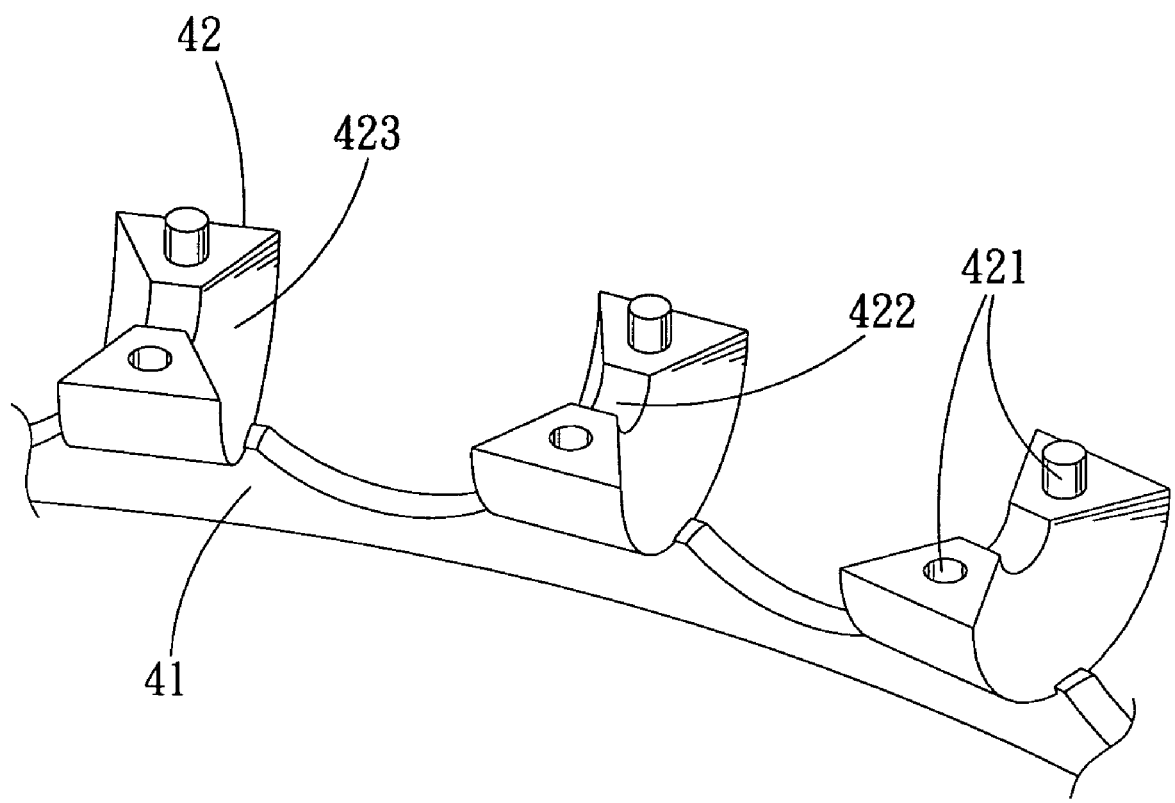
FIG. 2 is a partial amplified view of the retaining device for rolling-elements of FIG. 1.

FIG. 2 is a partial amplified view of the retaining device for rolling-elements of FIG. 1. It can be seen from the drawing that each partition 42 on the link-belt 41 is provided at its jointing portion with an engaging portion 421 and a notch 422, such that the partitions 42 can be butt-joined together and lubricant can flow through the notch 422 after the partitions 42 are butt-joined. Each partition 42 is further provided with a supporting portion 423 for abutting closely against the rolling-elements. In this manner, the partitions 42 are able to separate the rolling-elements and retain them firmly in the retaining device.

Figure 3:
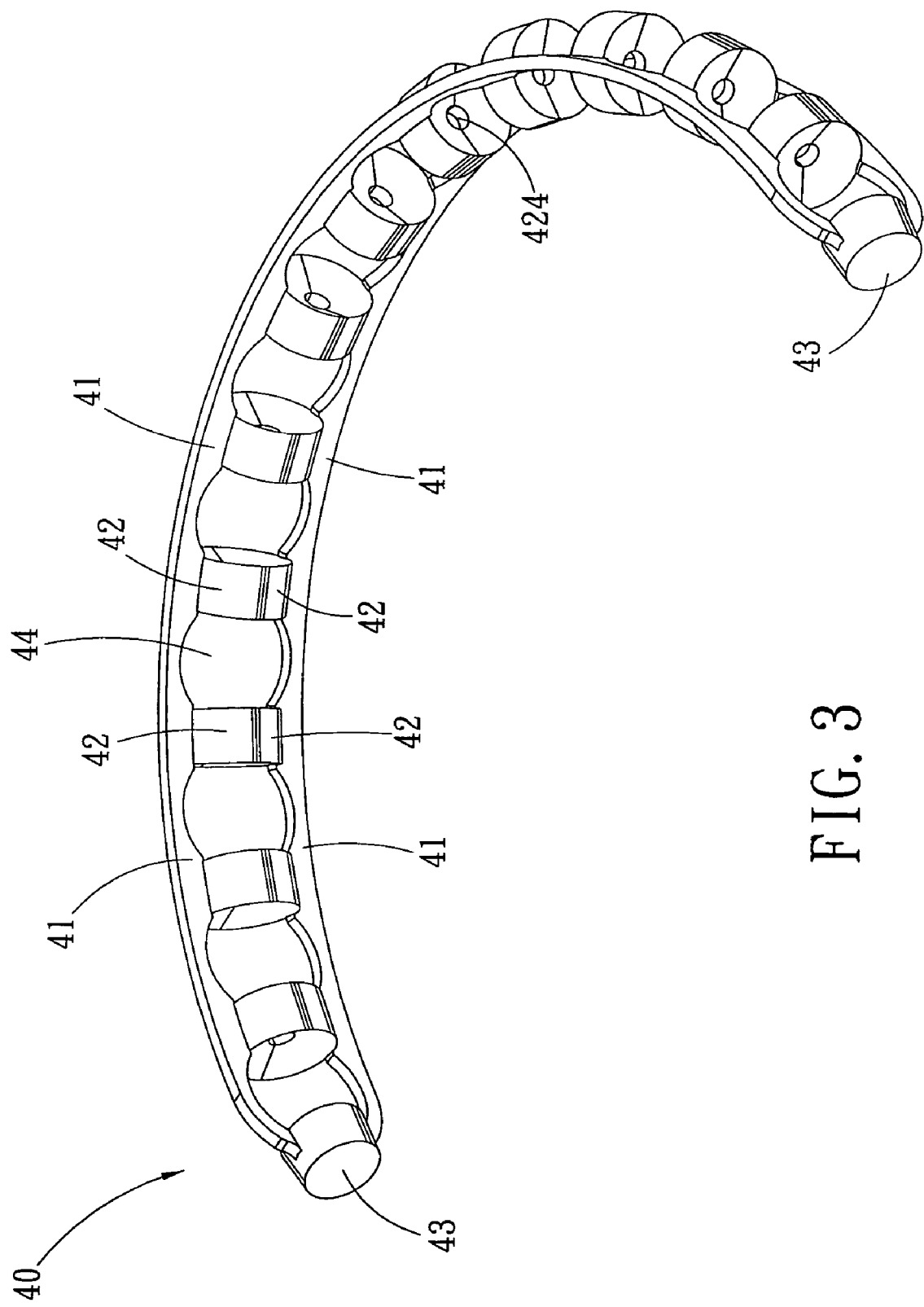
FIG. 3 is an assembly view of the retaining device for rolling-elements in FIG. 1.
Figure 4:
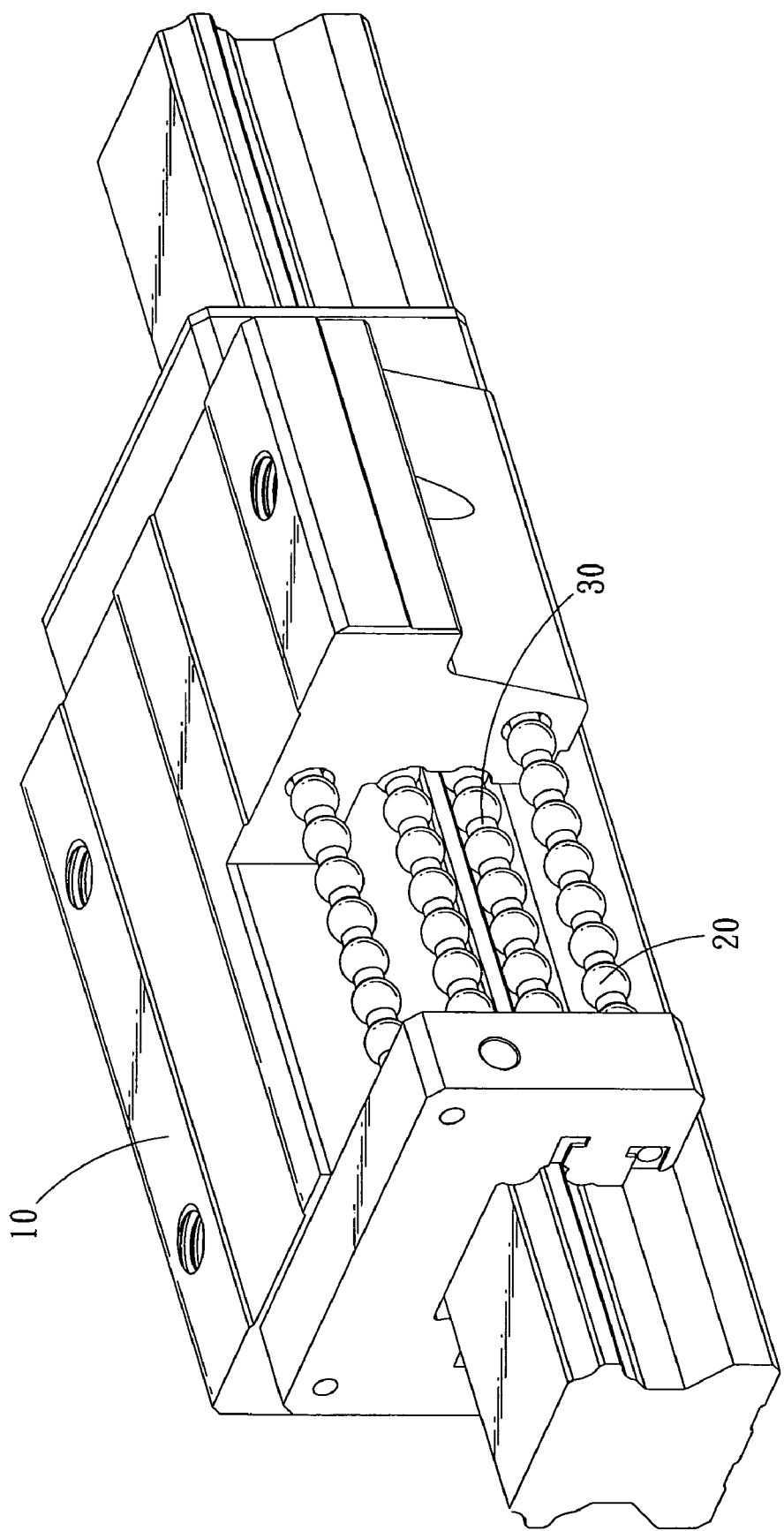
FIG. 4 is a perspective view of a retaining device for rolling-element of prior arts.
Figure 5:
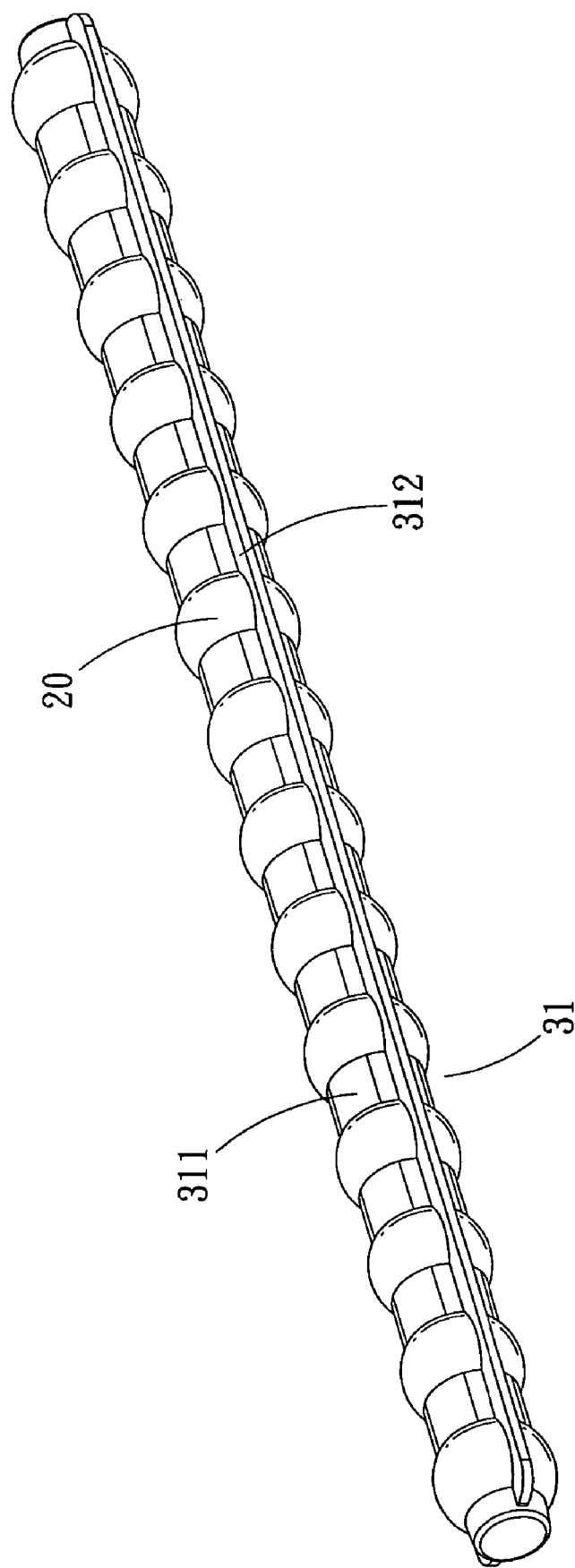
FIG. 5 is a perspective view of another type of retaining device for rolling-element of prior arts.

FIG. 3 is an assembly view of the retaining device for rolling-elements in FIG. 1. Wherein the end-parts 43 serves as a center and after the link-belt 41 and the partitions 42 at both sides of the end-parts 43 are turned about the center to abut-join together, the end-parts 43 will be located at both sides of the retaining device 40, such that the rolling-elements can be firmly retained in the retaining device 40. A passage 424 will be formed after each pair of corresponding partitions 42 butt-joined together for allowing the flow of lubricant, so that the retaining device 40 can be effectively lubricated. Each neighboring butt-joined partitions 42 is linked by the link-belt 41 to form a space 44, in the space the rolling-element is rotatably received. Furthermore, the retaining device can be designed as having a curvature after it is inwardly turned, and the radius of the curvature of retaining device is not smaller than that of the circulating track of the rolling-element, so as to allow the retaining device 40 to work smoothly. In addition, the passage 424 formed by the partitions 42 will expand when the rolling-elements pushes against the partitions, and it will contract when the retaining device 40 is moved by the rolling-elements. In this manner, the space of the passage 424 expands and contracts so as to improve the flow of the lubricant. The partitions are firmly butt-joined together by a bayonet joint.

While we have shown and described various embodiments in accordance with the present invention, it should be clear to those skilled in the art that further embodiments may be made without departing from the scope of the present invention.

What is claimed is:

1. A retaining device for rolling-element, in which plural rolling-elements being sequentially retained, which comprising:

partitions serving to separate the rolling-elements;

link-belt, which employed to link the partitions together;

wherein the link-belt links the partitions together to form a ring structure, a section of the ring structure being connectable to an opposite side portion of the ring structure, so as to make each two corresponding partitions butt-join together, the butt-joined partitions and the link-belt form a space, in which the rolling-element is rotatably retained.

2. The retaining device for rolling-element as claimed in claim 1, wherein the ring structure is provided at both ends with an end-part respectively after it is inwardly turned, so as to retain the rolling-elements securely in the retaining device.

3. The retaining device for rolling-element as claimed in claim 2, wherein the partitions are firmly butt-joined together by a bayonet joint.

4. The retaining device for rolling-element as claimed in claim 1, wherein the ring structure is turned in to form a structure having a curvature, and the curvature is not smaller than that of a circulating tack of the rolling-elements.

5. The retaining device for rolling-element as claimed in claim 4, wherein the partitions are firmly butt-joined together by a bayonet joint.

6. The retaining device for rolling-element as claimed in claim 1, wherein the partitions form a passage after they are butt-joined together, a space of the passage can expand or contract for allowing easy flow of lubricant through the passage.

7. The retaining device for rolling-element as claimed in claim 6, wherein the partitions are firmly butt-joined together by a bayonet joint.

8. The retaining device for rolling-element as claimed in claim 1, wherein the partitions are firmly butt-joined together by a bayonet joint.

* * * * *